US009830080B2

United States Patent
Qutub et al.

(10) Patent No.: US 9,830,080 B2
(45) Date of Patent: Nov. 28, 2017

(54) LOW POWER VOICE TRIGGER FOR ACOUSTIC APPARATUS AND METHOD

(71) Applicant: Knowles Electronics, LLC, Itasca, IL (US)

(72) Inventors: Sarmad Qutub, Des Plaines, IL (US); Robert Popper, Lemont, IL (US); Oddy Khamharn, Lombard, IL (US)

(73) Assignee: Knowles Electronics, LLC, Itasca, IL (US)

( * ) Notice: Subject to any disclaimer, the term of this patent is extended or adjusted under 35 U.S.C. 154(b) by 8 days.

(21) Appl. No.: 15/000,415

(22) Filed: Jan. 19, 2016

(65) Prior Publication Data

US 2016/0210051 A1    Jul. 21, 2016

Related U.S. Application Data

(60) Provisional application No. 62/105,900, filed on Jan. 21, 2015.

(51) Int. Cl.
| | |
|---|---|
| *H04R 19/04* | (2006.01) |
| *G06F 3/06* | (2006.01) |
| *G06F 13/28* | (2006.01) |
| *H04R 19/01* | (2006.01) |

(52) U.S. Cl.
CPC .......... *G06F 3/0604* (2013.01); *G06F 3/0647* (2013.01); *G06F 3/0673* (2013.01); *G06F 13/28* (2013.01); *H04R 19/01* (2013.01); *H04R 19/04* (2013.01); *Y02B 60/1228* (2013.01)

(58) Field of Classification Search
CPC . H04R 19/04; H04R 2201/003; G06F 3/0604; G06F 3/0647; G06F 3/0673; G06F 13/28; Y02B 60/1228

USPC .......... 381/113, 111, 112, 114, 116; 704/275
See application file for complete search history.

(56) References Cited

U.S. PATENT DOCUMENTS

| | | | |
|---|---|---|---|
| 4,052,568 | A | 10/1977 | Jankowski |
| 5,577,164 | A | 11/1996 | Kaneko |
| 5,598,447 | A | 1/1997 | Usui |
| 5,675,808 | A | 10/1997 | Gulick |
| 5,822,598 | A | 10/1998 | Lam |
| 5,983,186 | A | 11/1999 | Miyazawa |

(Continued)

FOREIGN PATENT DOCUMENTS

| | | |
|---|---|---|
| JP | 2001236095 | 8/2001 |
| JP | 2004219728 | 8/2004 |

(Continued)

OTHER PUBLICATIONS

International Search Report and Written Opinion for PCT/US2016/013859 dated Apr. 29, 2016 (12 pages).

(Continued)

*Primary Examiner* — Melur Ramakrishnaiah
(74) *Attorney, Agent, or Firm* — Foley & Lardner LLP

(57) ABSTRACT

An analog signal is received from an acoustic transducer. The analog signal is converted into digital data. A determination is made as to whether acoustic activity exists within the digital data. The digital data is stored in a temporary memory storage device and a count is maintained of an amount of digital data in the temporary memory storage device. When the count exceeds a predetermined threshold, at least some of the digital data is transmitted from the temporary memory storage device to a processor.

18 Claims, 3 Drawing Sheets

(56) References Cited

U.S. PATENT DOCUMENTS

| | | |
|---|---|---|
| 6,049,565 A | 4/2000 | Paradine |
| 6,057,791 A | 5/2000 | Knapp |
| 6,070,140 A | 5/2000 | Tran |
| 6,154,721 A | 11/2000 | Sonnic |
| 6,249,757 B1 | 6/2001 | Cason |
| 6,282,268 B1 | 8/2001 | Hughes |
| 6,324,514 B2 | 11/2001 | Matulich |
| 6,397,186 B1 | 5/2002 | Bush |
| 6,453,020 B1 | 9/2002 | Hughes |
| 6,564,330 B1 | 5/2003 | Martinez |
| 6,591,234 B1 | 7/2003 | Chandran |
| 6,640,208 B1 | 10/2003 | Zhang |
| 6,756,700 B2 | 6/2004 | Zeng |
| 7,190,038 B2 | 3/2007 | Dehe |
| 7,415,416 B2 | 8/2008 | Rees |
| 7,473,572 B2 | 1/2009 | Dehe |
| 7,619,551 B1 | 11/2009 | Wu |
| 7,630,504 B2 | 12/2009 | Poulsen |
| 7,774,202 B2 | 8/2010 | Spengler |
| 7,774,204 B2 | 8/2010 | Mozer |
| 7,781,249 B2 | 8/2010 | Laming |
| 7,795,695 B2 | 9/2010 | Weigold |
| 7,825,484 B2 | 11/2010 | Martin |
| 7,829,961 B2 | 11/2010 | Hsiao |
| 7,856,283 B2 | 12/2010 | Burk |
| 7,856,804 B2 | 12/2010 | Laming |
| 7,903,831 B2 | 3/2011 | Song |
| 7,936,293 B2 | 5/2011 | Hamashita |
| 7,941,313 B2 | 5/2011 | Garudadri |
| 7,957,972 B2 | 6/2011 | Huang |
| 7,994,947 B1 | 8/2011 | Ledzius |
| 8,171,322 B2 | 5/2012 | Fiennes |
| 8,208,621 B1 | 6/2012 | Hsu |
| 8,275,148 B2 | 9/2012 | Li |
| 8,331,581 B2 | 12/2012 | Pennock |
| 8,666,751 B2 | 3/2014 | Murthi |
| 8,687,823 B2 | 4/2014 | Loeppert |
| 8,731,210 B2 | 5/2014 | Cheng |
| 8,798,289 B1 | 8/2014 | Every |
| 8,804,974 B1 | 8/2014 | Melanson |
| 8,849,231 B1 | 9/2014 | Murgia |
| 8,972,252 B2 | 3/2015 | Hung |
| 8,996,381 B2 | 3/2015 | Mozer |
| 9,020,819 B2 | 4/2015 | Saitoh |
| 9,043,211 B2 | 5/2015 | Haiut |
| 9,059,630 B2 | 6/2015 | Gueorguiev |
| 9,073,747 B2 | 7/2015 | Ye |
| 9,076,447 B2 | 7/2015 | Nandy |
| 9,111,548 B2 | 8/2015 | Nandy |
| 9,112,984 B2 | 8/2015 | Sejnoha |
| 9,113,263 B2 | 8/2015 | Furst |
| 9,119,150 B1 | 8/2015 | Murgia |
| 9,142,215 B2 | 9/2015 | Rosner |
| 9,147,397 B2 | 9/2015 | Thomsen |
| 9,161,112 B2 | 10/2015 | Ye |
| 2002/0054588 A1 | 5/2002 | Mehta |
| 2002/0116186 A1 | 8/2002 | Strauss |
| 2002/0123893 A1 | 9/2002 | Woodward |
| 2002/0184015 A1 | 12/2002 | Li |
| 2003/0004720 A1 | 1/2003 | Garudadri |
| 2003/0061036 A1 | 3/2003 | Garudadri |
| 2003/0144844 A1 | 7/2003 | Colmenarez |
| 2004/0022379 A1 | 2/2004 | Klos |
| 2005/0207605 A1 | 9/2005 | Dehe |
| 2006/0074658 A1 | 4/2006 | Chadha |
| 2006/0233389 A1 | 10/2006 | Mao |
| 2006/0247923 A1 | 11/2006 | Chandran |
| 2007/0168908 A1 | 7/2007 | Paolucci |
| 2007/0278501 A1 | 12/2007 | MacPherson |
| 2008/0089536 A1 | 4/2008 | Josefsson |
| 2008/0175425 A1 | 7/2008 | Roberts |
| 2008/0201138 A1 | 8/2008 | Visser |
| 2008/0267431 A1 | 10/2008 | Leidl |
| 2008/0279407 A1 | 11/2008 | Pahl |
| 2008/0283942 A1 | 11/2008 | Huang |
| 2009/0001553 A1 | 1/2009 | Pahl |
| 2009/0180655 A1 | 7/2009 | Tien |
| 2010/0046780 A1 | 2/2010 | Song |
| 2010/0052082 A1 | 3/2010 | Lee |
| 2010/0057474 A1 | 3/2010 | Kong |
| 2010/0128894 A1 | 5/2010 | Petit |
| 2010/0128914 A1 | 5/2010 | Khenkin |
| 2010/0131783 A1* | 5/2010 | Weng ............... G06F 1/3203 713/320 |
| 2010/0183181 A1 | 7/2010 | Wang |
| 2010/0246877 A1 | 9/2010 | Wang |
| 2010/0290644 A1 | 11/2010 | Wu |
| 2010/0292987 A1 | 11/2010 | Kawaguchi |
| 2010/0322443 A1 | 12/2010 | Wu |
| 2010/0322451 A1 | 12/2010 | Wu |
| 2011/0007907 A1 | 1/2011 | Park |
| 2011/0013787 A1 | 1/2011 | Chang |
| 2011/0029109 A1 | 2/2011 | Thomsen |
| 2011/0075875 A1 | 3/2011 | Wu |
| 2011/0106533 A1 | 5/2011 | Yu |
| 2011/0208520 A1 | 8/2011 | Lee |
| 2011/0280109 A1 | 11/2011 | Raymond |
| 2012/0010890 A1 | 1/2012 | Koverzin |
| 2012/0232896 A1 | 9/2012 | Taleb |
| 2012/0250881 A1 | 10/2012 | Mulligan |
| 2012/0310641 A1 | 12/2012 | Niemisto |
| 2013/0044898 A1 | 2/2013 | Schultz |
| 2013/0058506 A1 | 3/2013 | Boor |
| 2013/0223635 A1 | 8/2013 | Singer |
| 2013/0226324 A1 | 8/2013 | Hannuksela |
| 2013/0246071 A1 | 9/2013 | Lee |
| 2013/0322461 A1 | 12/2013 | Poulsen |
| 2013/0343584 A1 | 12/2013 | Bennett |
| 2014/0064523 A1 | 3/2014 | Kropfitsch |
| 2014/0122078 A1 | 5/2014 | Joshi |
| 2014/0143545 A1 | 5/2014 | McKeeman |
| 2014/0163978 A1 | 6/2014 | Basye |
| 2014/0177113 A1 | 6/2014 | Gueorguiev |
| 2014/0188467 A1 | 7/2014 | Jing |
| 2014/0188470 A1 | 7/2014 | Chang |
| 2014/0197887 A1 | 7/2014 | Hovesten |
| 2014/0244269 A1 | 8/2014 | Tokutake |
| 2014/0244273 A1 | 8/2014 | Laroche |
| 2014/0249820 A1 | 9/2014 | Hsu |
| 2014/0257813 A1 | 9/2014 | Mortensen |
| 2014/0257821 A1 | 9/2014 | Adams |
| 2014/0274203 A1 | 9/2014 | Ganong |
| 2014/0278435 A1 | 9/2014 | Ganong |
| 2014/0281628 A1 | 9/2014 | Nigam |
| 2014/0337036 A1* | 11/2014 | Haiut ............... G06F 1/3265 704/275 |
| 2014/0343949 A1 | 11/2014 | Huang |
| 2014/0348345 A1* | 11/2014 | Furst ............... H04R 3/00 381/111 |
| 2014/0358552 A1 | 12/2014 | Xu |
| 2015/0039303 A1 | 2/2015 | Lesso |
| 2015/0043755 A1 | 2/2015 | Furst |
| 2015/0046157 A1 | 2/2015 | Wolff |
| 2015/0046162 A1 | 2/2015 | Aley-Raz |
| 2015/0049884 A1 | 2/2015 | Ye |
| 2015/0055803 A1 | 2/2015 | Qutub |
| 2015/0058001 A1 | 2/2015 | Dai |
| 2015/0063594 A1 | 3/2015 | Nielsen |
| 2015/0073780 A1 | 3/2015 | Sharma |
| 2015/0073785 A1 | 3/2015 | Sharma |
| 2015/0088500 A1 | 3/2015 | Conliffe |
| 2015/0106085 A1 | 4/2015 | Lindahl |
| 2015/0110290 A1 | 4/2015 | Furst |
| 2015/0112690 A1 | 4/2015 | Guha |
| 2015/0134331 A1 | 5/2015 | Millet |
| 2015/0154981 A1 | 6/2015 | Barreda |
| 2015/0161989 A1 | 6/2015 | Hsu |
| 2015/0195656 A1 | 7/2015 | Ye |
| 2015/0206527 A1 | 7/2015 | Connolly |
| 2015/0256660 A1 | 9/2015 | Kaller |
| 2015/0256916 A1 | 9/2015 | Volk |
| 2015/0287401 A1 | 10/2015 | Lee |
| 2015/0302865 A1 | 10/2015 | Pilli |
| 2015/0304502 A1 | 10/2015 | Pilli |

(56) References Cited

U.S. PATENT DOCUMENTS

| | | |
|---|---|---|
| 2015/0350760 A1 | 12/2015 | Nandy |
| 2015/0350774 A1 | 12/2015 | Furst |
| 2016/0012007 A1 | 1/2016 | Popper |
| 2016/0087596 A1 | 3/2016 | Yurrtas |
| 2016/0133271 A1 | 5/2016 | Kuntzman |
| 2016/0134975 A1 | 5/2016 | Kuntzman |

FOREIGN PATENT DOCUMENTS

| | | |
|---|---|---|
| WO | 2009130591 | 1/2009 |
| WO | 2011106065 | 1/2011 |
| WO | 2011140096 | 2/2011 |
| WO | 2013049358 | 1/2013 |
| WO | 2013085499 | 1/2013 |

OTHER PUBLICATIONS

U.S. Appl. No. 14/285,585, dated May 2014, Santos.
U.S. Appl. No. 14/495,482, dated Sep. 2014, Murgia.
U.S. Appl. No. 14/522,264, dated Oct. 2014, Murgia.
U.S. Appl. No. 14/698,652, dated Apr. 2015, Yapanel.
U.S. Appl. No. 14/749,425, dated Jun. 2015, Verma.
U.S. Appl. No. 14/853,947, dated Sep. 2015, Yen.
U.S. Appl. No. 62/100,758, filed Jan. 7, 2015, Rossum.
"MEMS technologies: Microphone" EE Herald Jun. 20, 2013.
Delta-sigma modulation, Wikipedia (Jul. 4, 2013).
International Search Report and Written Opinion for PCT/EP2014/064324, dated Feb. 12, 2015 (13 pages).
International Search Report and Written Opinion for PCT/US2014/038790, dated Sep. 24, 2014 (9 pages).
International Search Report and Written Opinion for PCT/US2014/060567 dated Jan. 16, 2015 (12 pages).
International Search Report and Written Opinion for PCT/US2014/062861 dated Jan. 23, 2015 (12 pages).
Kite, Understanding PDM Digital Audio, Audio Precision, Beaverton, OR, 2012.
Pulse-density modulation, Wikipedia (May 3, 2013).
Search Report of Taiwan Patent Application No. 103135811, dated Apr. 18, 2016 (1 page).

\* cited by examiner

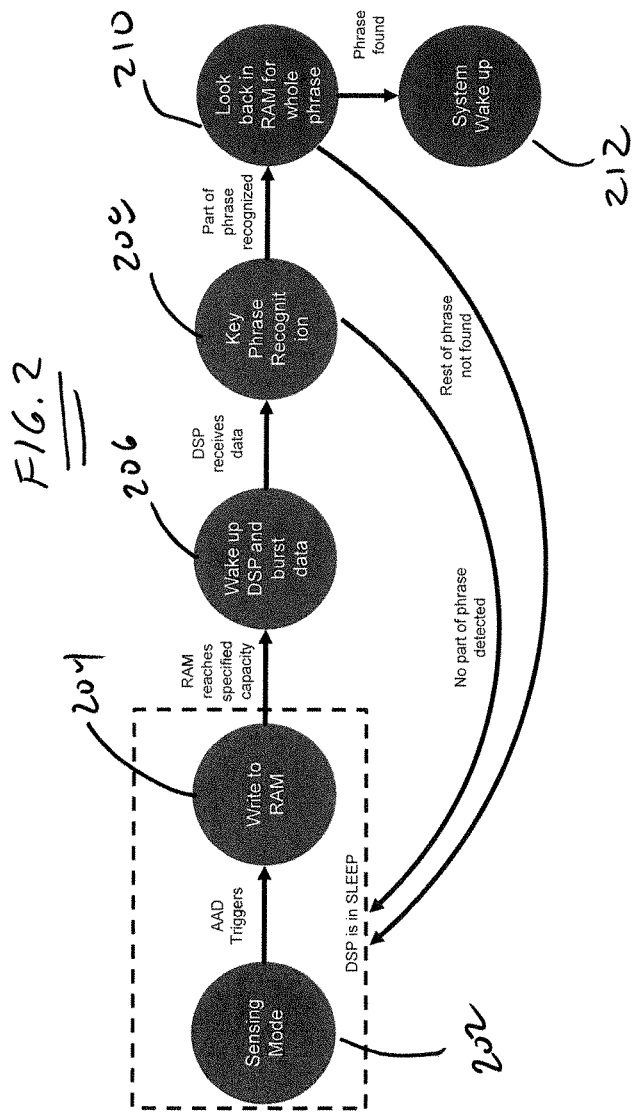

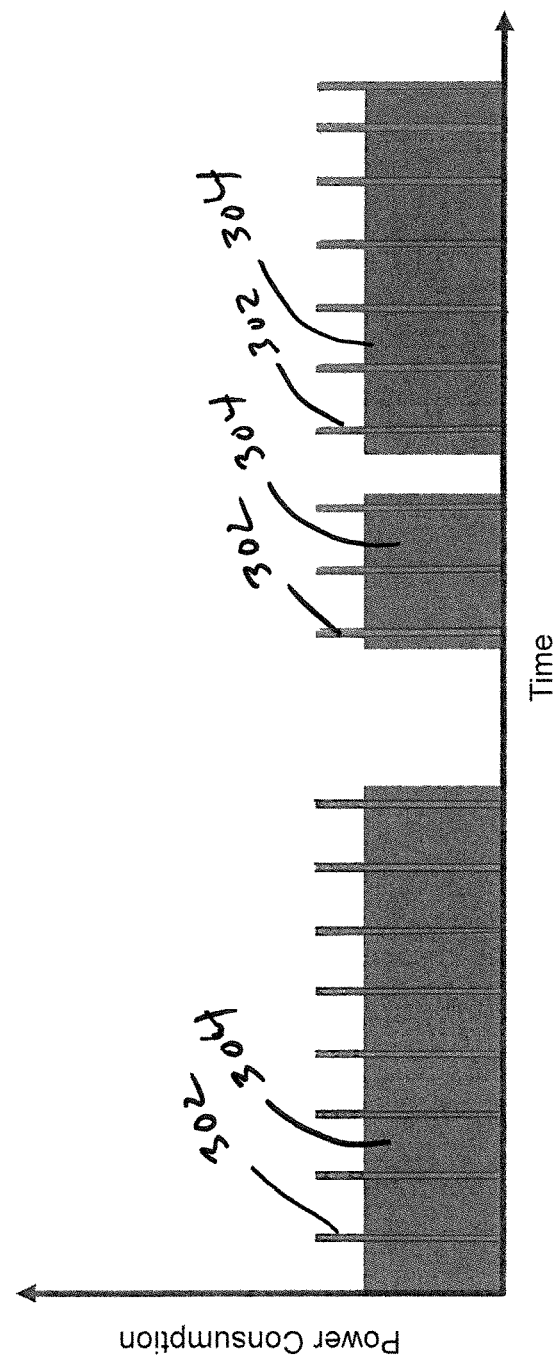

LOW POWER VOICE TRIGGER FOR ACOUSTIC APPARATUS AND METHOD

CROSS-REFERENCE TO RELATED APPLICATION

This patent claims benefit under 35 U.S.C. §119(e) to U.S. Provisional Application No. 62/105,900 entitled "Low Power Voice Trigger for Acoustic Apparatus and Method" filed Jan. 21, 2015, the content of which is incorporated herein by reference in its entirety.

TECHNICAL FIELD

This application relates to acoustic devices and, more specifically, to the operation of these devices.

BACKGROUND

Different types of acoustic devices have been used through the years. One type of device is a microphone. In a microelectromechanical system (MEMS) microphone, a MEMS die includes a diagram and a back plate. The MEMS die is supported by a substrate and enclosed by a housing (e.g., a cup or cover with walls). A port may extend through the substrate (for a bottom port device) or through the top of the housing (for a top port device). In any case, sound energy traverses through the port, moves the diaphragm and creates a changing potential of the back plate, which creates an electrical signal. Microphones are deployed in various types of devices such as personal computers or cellular phones.

Microphones are used in various applications that utilize voice trigger applications. In previous approaches, an acoustic activity detector detects a voice signal and sends out a signal to wake up a digital signal processor (DSP) for the detection of key phrases in the voice. Once the key phrase is found, all input speech data can be processed. Consequently, any time that the acoustic activity detector is triggering, the DSP is constantly searching for key phrases using power. Mobile and wearable devices have small batteries that can be depleted by the repeated triggering described above.

The problems of previous approaches have resulted in some user dissatisfaction with these previous approaches.

BRIEF DESCRIPTION OF THE DRAWINGS

For a more complete understanding of the disclosure, reference should be made to the following detailed description and accompanying drawings wherein:

FIG. 2 comprises a block diagram of a state transition diagram showing the operation of a microphone that provides a low power operation for voice trigger operations according to various embodiments of the present invention;

FIG. 3 comprises a graph that shows power consumption levels during the operation of a microphone that provides a low power operation for voice trigger operations according to various embodiments of the present invention.

Figure 1:
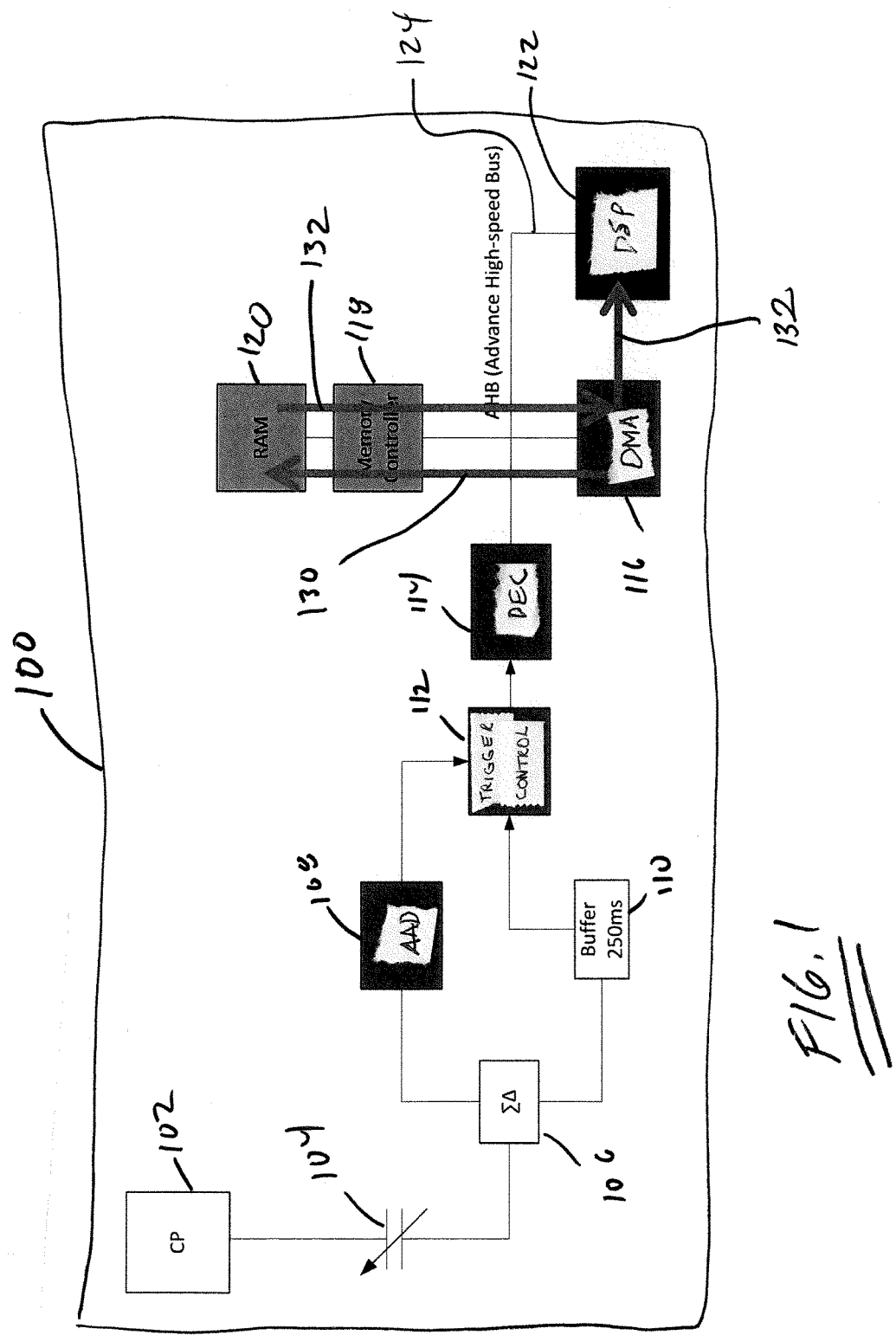
FIG. 1 comprises a block diagram of a microphone that provides a low power operation for voice trigger operations according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required.

It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches provide for low power operation of a microphone during voice triggering applications. The output of the acoustic activity detector inside of the microphone is stored in internal memory (e.g., a random access memory (RAM)) via direct memory access (DMA) techniques. When the memory device reaches a predetermined capacity, a digital signal processor (DSP) (or other processing device) is woken up and the stored data is clocked from the internal memory device to the DSP via DMA (e.g., at a high frequency) via some data bus (e.g., an advanced high-speed bus (AHB)).

Power consumption is reduced (especially in noisy environments) because in the approaches presented herein the DSP is periodically activated for processing small fragments of data very quickly to determine if a key phrase was detected. Also, the system is enabled to deactivate the DSP at times when acoustic activity is detected. Additionally, the present approaches allow for the periodic wake up and sleep of the DSP in noisy environments when the acoustic activity detector (AAD) would (in previous systems) be triggering.

In many of these embodiments, microphone output triggered by an acoustic activity detector (AAD) is clocked into memory. When the data input into the memory reaches a predetermined value, the data is clocked out of the memory at a high frequency to a digital signal processor (DSP) via a data bus. If any part of a predetermined phrase is found by the DSP, the DSP processes more data stored in the memory to determine if the key phrase was received. If the entire phrase is recovered, the entire system (e.g., the DSP and associated consumer electronic devices it may be coupled to) is awakened. If the entire phrase is not recovered, the DSP returns to a sleep (low power) mode of operation.

Referring now to FIG. 1, one example of a microphone (or microphone assembly) 100 is described. The microphone 100 includes a charge pump 102, a microelectromechanical system (MEMS) device 104, a sigma delta converter 106, an acoustic activity detector (AAD) module 108, a buffer 110, a trigger control module 112, a decimator 114, a direct memory access (DMA) control module 116, a memory controller 118, a memory 120 (e.g., a RAM), and a digital signal processor (DSP) 122. It will be appreciated that at least some of these components may be disposed on an application specific integrated circuit (ASIC). It will also be appreciated that other sound transducers such as piezoelectric devices or others may be used in place of the MEMS device.

The charge pump 102 is a voltage or current source that is used to charge the MEMS device 104. The MEMS device 104 includes a diaphragm and a back plate, and converts sound energy into electrical signals. The sigma delta converter 106 converts analog electrical signals into pulse density modulation (PDM) data.

The AAD module 108 determines whether voice is detected in the incoming signal from the MEMS device 104. These functions may be accomplished by various techniques known to those skilled in the art. The buffer 110 stores data, and in one example provides 250 ms of delay. The trigger control module 112 is triggered to release data when human voice is detected by the AAD module 108. The decimator 114 converts the PDM data into PCM data. The DMA control module 116 controls the flow of data to and from the memory 120, and to the DSP 122. The memory controller 118 keeps a record of the amount of data that the DMA control module has loaded into the memory 120 and informs the DMA control module 116 when this amount exceeds a predetermined value. The DSP 122 determines whether particular trigger words or phrases are present in the data.

It will be appreciated that these elements may be implemented in any combination of computer hardware and/or software. For instance, many if not all of these elements may be implemented using computer instructions executed on a processor. It will be further appreciated that these components may be disposed within a single assembly or covering structure.

In one example of the operation of the system of FIG. 1, charge pump 102 charges the MEMS device 104, which converts sound energy to an analog electrical signal. The analog electrical signal is converted into a digital PDM signal by the sigma delta converter 106. The converted signal is stored in the buffer 110. The AAD module 108 detects the presence of human voice in the signal and triggers the trigger control module 112 to release the data in the buffer 110 to the decimator 114. The decimator 114 converts the data into pulse code modulation (PCM) data. The DMA control module stores the data into memory 120 (shown by path labeled 130). The memory controller 118 monitors the amount of data that has been stored in the memory 120. When the amount reaches a predetermined value, the DMA causes data to be transmitted in a burst from the memory 120 to the DSP 122 (this data flow is indicted by the arrows labeled 132). This data transfer is accomplished by a bus 124, which in one example is an advanced high-speed bus (AHB). Other examples are possible.

The DSP 122 looks for any part of the key phrase. If any part is detected (even if in the later half of the phrase), the DSP 122 looks further back in the data to see if the beginning of the phrase was recorded to correlate for key word recognition. The above steps may be repeated if the memory 120 reaches the predetermined threshold again. It will be appreciated that various types of digital data (e.g., PDM, PCM and SoundWire).

Referring now to FIG. 2, one example of a state transition diagram showing microphone operation is described. It will be appreciated that the state transitions shown in FIG. 2, utilize the components shown in FIG. 1. In this example, the system moves between a sensing mode state 202, a write-to-RAM state 204, a wake-up state 206, a key phrase recognition state 208, a look-back state 210, and a system wake-up state 212. At steps 202 and 204 the DSP is asleep.

Beginning with state 202, the system senses sound energy, for example, using a MEMS device (but other transducers such as piezoelectric transducers can also be used). When voice activity is determined by the AAD module, control moves to state 204 where the data is written to memory, for example, a RAM.

When RAM reaches a predetermined capacity, control continues at step 206, where the DSP is woken up and a burst of data is transmitted from the RAM to the DSP using the DMA control module and a data bus. When the DSP receives the data, control continues at step 208, where key phrase recognition is performed. When no part of the predetermined key phrase is determined, control returns to step 202. When part of the phrase is determined, control continues with step 210.

At step 210, the DSP looks back in RAM for the entire phrase (assuming step 208 did not find the whole phrase). If the rest of the phrase is not found, control returns to step 202. If the phrase is found, the system is woken up to perform further processing since the key phrase was found.

Referring now to FIG. 3, one example of a graph showing the power levels used by the present approaches is described. As shown, DSP power amounts consumed (represented by the upwardly extending bars 302) represent the power used by the DSP when DMA transfer is used as described herein. The boxes labeled 304 represent power not used or consumed in the present approaches, but consumed in previous approaches (i.e., when DMA transfer was not used). The power amounts 304 are not consumed by the approaches described here because the DSP is not activated all the time (or most of the time) and searching for key phrases. In other words, power amounts 304 were used in previous systems, but not in the present approaches.

It will be appreciated that while the higher frequency processing of greater amounts of data will require more power at some small intervals in time, it will allow the processing of data in significantly less periods of time. And, this mode of operation uses significantly less power than previous approaches.

Put another way, although the peak values of amounts 302 are higher than the peak value of power amounts 304, peak values 302 are consumed over very small periods or intervals of time, while power amounts 304 are consumed over comparatively much greater and longer periods or intervals of time. Thus, the total power consumed by power amounts 302 is significantly less than the power consumed by amounts 304.

Also, this mode of operation requires significantly less power consumption than previous voice triggers in noisy situations or environments when ambient noise levels are constantly triggering the AAD module.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method comprising:
   receiving an analog signal from an acoustic transducer;
   converting the analog signal into digital data;
   determining whether acoustic activity exists within the digital data;
   in response to determining acoustic activity exists, storing the digital data in a temporary memory storage device and maintaining a count of an amount of digital data in the temporary memory storage device;
   in response to the count exceeding a threshold, sending a processor wake-up signal and transmitting at least some of the digital data from the temporary memory storage device.

2. The method of claim 1 implemented in a microphone assembly, wherein the acoustic transducer is a micro electro mechanical system (MEMS) transducer disposed in a housing of the microphone assembly.

3. The method of claim 1, further comprising storing at least some of the digital data in a buffer when determining whether acoustic activity exists within the digital data, wherein the digital data is released from the buffer and stored in the temporary memory storage device in response to determining that acoustic activity exists.

4. The method of claim 1, wherein the transmitting occurs over a high speed data bus to a processor.

5. The method of claim 1, wherein the temporary memory device is a random access memory (RAM).

6. The method of claim 1, wherein the digital data is PDM data at some places in a signal path.

7. The method of claim 1, wherein digital data is PCM data at some places in a signal path.

8. The method of claim 1, wherein the digital data is Sound-Wire data at some places in a signal path.

9. A microphone apparatus comprising:
an acoustic transducer configured to convert acoustic energy into an analog signal;
a converter coupled to the acoustic transducer and configured to convert the analog signal into digital data;
an acoustic activity detection (AAD) module coupled to the converter and configured to determine whether acoustic activity exists within the digital data;
a buffer coupled to the converter and configured to store the digital data while the AAD determines whether acoustic activity exists within the digital data;
a temporary memory storage device;
a controller configured to:
cause the digital data stored in the buffer to be stored in the temporary memory storage device upon determining that acoustic activity exists within the digital data,
maintain a count of an amount of digital data stored in the temporary memory storage device, and
send a processor wake-up signal and transmit at least some of the digital data from the temporary memory storage device when the count exceeds a threshold.

10. The microphone apparatus of claim 9, wherein the acoustic transducer is a micro electro mechanical system (MEMS) transducer disposed on a substrate and enclosed by a housing of the apparatus.

11. The microphone apparatus of claim 9, further comprising a processor, wherein the processor wake-up signal and the digital data are transmitted to the processor after the count exceeds the threshold.

12. The microphone apparatus of claim 9, wherein the controller includes a DMA controller configured to cause digital data stored in the buffer to be stored in the temporary memory storage device upon determining that acoustic activity exists within the digital data, a memory controller configured to maintain the account of the amount of digital data stored in the temporary memory storage device.

13. The microphone apparatus of claim 9, wherein the temporary memory device is a random access memory (RAM).

14. A method of operating an acoustic device, comprising:
sensing sound energy and converting the sound energy into data;
in response to acoustic activity being detected in the data, storing the data in a temporary memory storage device;
in response to the amount of data stored in the temporary memory storage device exceeding a threshold, waking up a digital signal processor and transmitting at least some of the data in a burst from the temporary memory storage device to the digital signal processor; and
at the digital signal processor, determining whether a keyword is present in the data.

15. The method of claim 14, when a part of a keyword is found in the data, accessing the temporary memory storage device to determine whether the remaining part of the keyword is present.

16. The method of claim 15, further comprising when the keyword in whole is detected in the data, waking up a host device associated with the acoustic device.

17. The method of claim 14, wherein the temporary memory device is a random access memory (RAM).

18. The method of claim 14, further comprising storing the data in a buffer, wherein storing the data in the temporary memory storage device includes releasing the data from the buffer to the temporary memory storage device.

* * * * *